No. 674,681. Patented May 21, 1901.
L. M. HOOPER.
TRAP FOR CLOSETS OR URINALS.
(Application filed May 17, 1897.)
(No Model.)
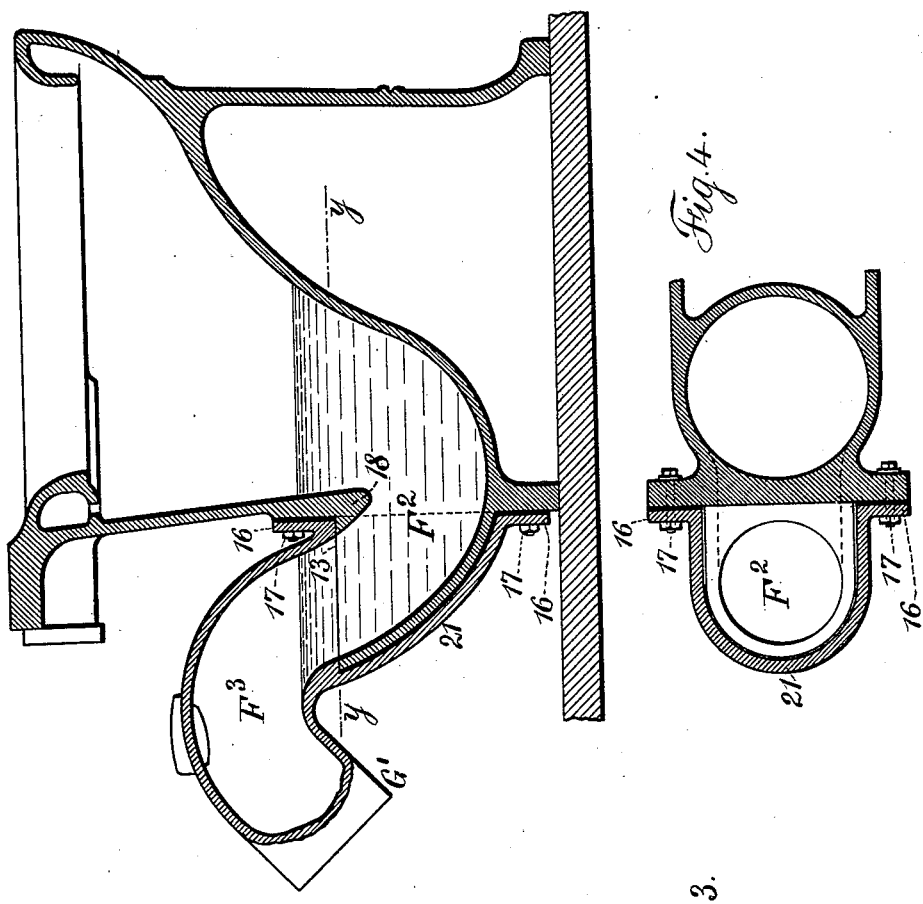
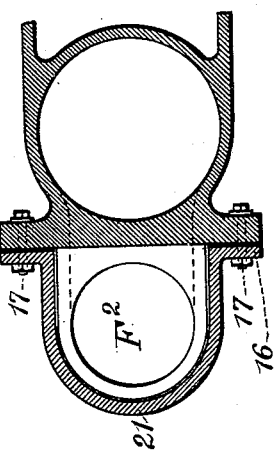
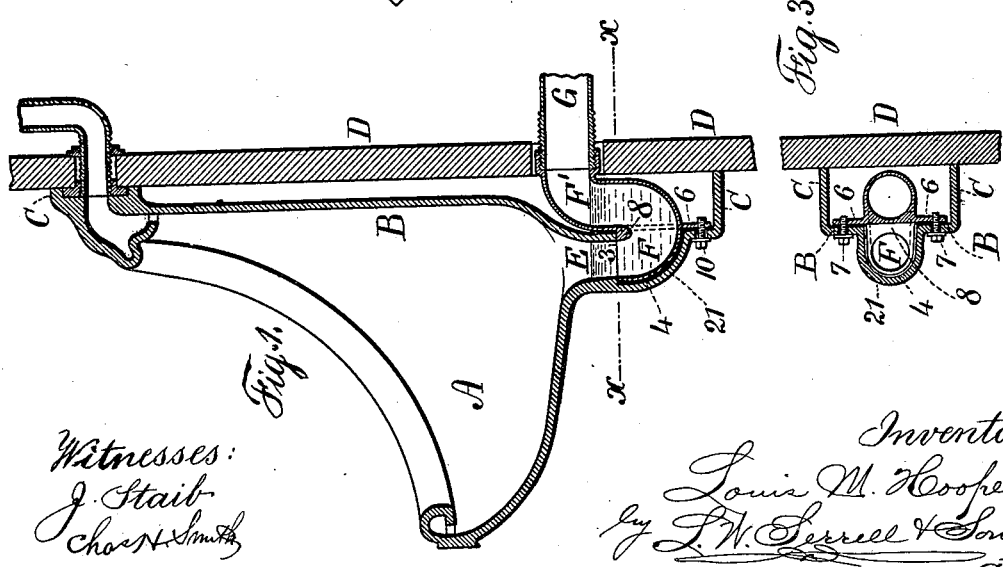
Witnesses:
J. Staib
Chas H Smith
Inventor:
Louis M. Hooper
by L. W. Serrell & Son
Attys
THE NORRIS PETERS CO., PHOTO-LITHO., WASHINGTON, D. C.

UNITED STATES PATENT OFFICE.

LOUIS M. HOOPER, OF RUTHERFORD, NEW JERSEY, ASSIGNOR TO THE J. L. MOTT IRON WORKS, OF NEW YORK, N. Y.

TRAP FOR CLOSETS OR URINALS.

SPECIFICATION forming part of Letters Patent No. 674,681, dated May 21, 1901.

Application filed May 17, 1897. Serial No. 636,889. (No model.)

*To all whom it may concern:*

Be it known that I, LOUIS M. HOOPER, a citizen of the United States, residing at Rutherford, in the county of Bergen and State of New Jersey, have invented an Improvement in Traps for Closets or Urinals, of which the following is a specification.

Efforts have heretofore been made for uniting the porcelain of the closet or urinal with the metallic waste-pipe in such a manner that the joint will be below the water-line, so that if leakage should occur it would be of the water in the trap that would be noticeable rather than of sewer-gases from the soil-pipe, and in some instances a quarter-circle bend or quadrantal elbow has been employed, setting partially within or against the porcelain.

The object of the present invention is to provide a semicircular trap or bend and a vertical joint between the porcelain and the metal, the downward projection, which passes into the water and forms with it the trap, being integral with the semicircular bend or trap and bolted directly thereto and independently of any other fastening, and the parts are constructed so that they are easily put together with putty or other cementing material or they can be taken apart for repairing or for repacking, and there is no risk of the trap becoming unsealed through the escape of water at the joints between the metal and the porcelain.

In the drawings, Figure 1 is a vertical section representing my improvement as applied to a urinal, and Fig. 2 is a similar view of the improvement as applied with a water-closet trap. Fig. 3 is a horizontal plan at the line $x\,x$ of Fig. 1, and Fig. 4 is a horizontal plan at the line $y\,y$ of Fig. 2.

The basin A of the urinal is provided with a back plate B and a flange C, the edge of which rests against the wall D, so as to leave a space between the back plate B and the wall, and at the lower part of the bowl or basin is a discharge-opening E, terminating with a straight lower end at 3, and the porcelain is recessed at 4 to receive one side of the semicircular bend or trap F, which is of metal and provided with a reverse bend F' to the discharge or waste pipe G, and there is a flange 6 extending out from the half-circle bend and setting flush against the back face of the back plate, and screws at 7 are employed, passing through the porcelain for bolting the trap firmly in place in the recess provided for it below the lower end 3 of the discharge opening or pipe E.

It will be seen that the semicircular trap of the closet and of the urinal are each provided with a vertical exterior flange, the urinal with a downward-projecting dip 8 and the closet with a downward-projecting dip 18, each entering the water of the trap and extending below a horizontal free edge at a right angle to the said exterior flange of the urinal or trap and at a higher level than the free end of the said dip. This horizontal free edge in the urinal is made with the pipe of the trap, and in the closet said edge is made with the integral trap and closet-bowl. In both cases there is a flange (6 in the urinal and 16 in the closet) for connection with the flange of the urinal or closet, and the dam of the trap is at a higher level than said horizontal free edge, and the flanges surrounding the trap and the lapping connection are all below the line of water in the trap and the free edge of the trap, also below the water-line, but above the free end of the dip, and hence should there be with either structure a leak at the horizontal free edge the trap cannot become unsealed, because the leakage is above the dip and the water cannot be exhausted below said edge.

When this improvement is employed with a water-closet, the porcelain and metal parts may be transposed—that is to say, the half-circle bend $F^2$, forming the trap, is made of porcelain, and the reverse bend $F^3$ is made of metal, and the flange 16, of metal, rests against the porcelain, and the screws 17 are used to bolt the parts together, and the downward projection 18 is of porcelain, passing down into the half-circle bend of the trap below the joint at 13 between the metal and the porcelain. In both instances the trap containing the water is complete and cannot be unsealed by leakage at the joint, and leakage will pass down outside the parts, so as to be visible and attract attention, so that the defect can be rectified, and the joint is vertical and made directly between the flange of the pipe and the porcelain, so that the closet or urinal is reliably connected independently of any other support.

It will be apparent that in the case of a water-closet the metal part of the waste-pipe G' might pass into the porcelain bowl of the closet the same as the metal portion of the trap F passes into the porcelain portion of the urinal, as shown in Fig. 1.

In all cases the joint between the porcelain and the metal where the curved portion of the trap and the curved portion of the porcelain come together is below the horizontal joint and below the level of the water, and the metal portion firmly supports the porcelain portion. Hence there is less risk of the parts separating than in those cases where the porcelain portion is liable to draw away and separate from the metal portion, and the vertical joint and the metal flange that forms one side of the joint against which the porcelain is bolted is directly adjacent to the body of the closet or urinal, at the back plate thereof, and the screws that form the connections between the porcelain and the metal flange pass through those portions of the porcelain that are easily separable and where they are not exposed to moisture or injury, because in the case of the urinal one screw can be applied directly below the trap, as seen at 10, and a screw at each side, as seen at 7, Fig. 3, and in the case of the water-closet it is advantageous to provide four screws 17, two at each side of the trap, passing through the flanges of the porcelain that project at opposite sides of the wall of the basin, as seen in Fig. 4, and the exterior portion 21, whether the same is of metal, as in Fig. 2, or of porcelain, as in Fig. 1, extends down below the horizontal joint between the respective parts and forms a shield reaching from the horizontal joint down to the bottom part of the trap, and this being filled with putty or other cementing material is easily made water-tight, and in cases where the parts have to be separated for repair or for repacking it is only necessary to remove the screws and the porcelain can be drawn away horizontally from the metallic portion and such metallic portion remain in its fixed position. This gives great facility for repairs, and there is no risk of the porcelain portion separating from the metallic portion in consequence of shrinkage of timbers or otherwise.

I claim as my invention—

1. The semicircular trap of a closet or urinal having a vertical exterior flange, a downward-projecting dip into the water and a horizontal free edge at a right angle to the exterior flange and at a higher level than the free end of the dip, in combination with a curved shield extending downward, lapping upon and setting against the exterior of the trap and having a flange for connection with the flange of the trap, and the dam of the trap being at a higher level than said horizontal free edge, the flanges surrounding the trap and the lapping connection being all below the line of water in the trap and the free edge of the trap being also below the line of water but above the end of the dip, substantially as and for the purposes set forth.

2. The semicircular and integral trap of an earthenware water-closet having an annular vertical exterior flange at the back, a downward-projecting dip into the water and a horizontal free edge at a right angle to the exterior flange and at a higher level than the free end of the dip, in combination with a metal pipe having a curved shield extending downward, lapping upon and setting against the exterior of the trap and having a flange for connection with the flange of the trap, and the dam of the trap being in the metal pipe at a higher level than said horizontal free edge of the closet, the flanges surrounding the trap and the lapping connection being all below the line of water in the trap and the free edge of the trap being also below the line of water but above the end of the dip, substantially as and for the purposes set forth.

Signed by me this 14th day of May, 1897.

L. M. HOOPER.

Witnesses:
R. H. BRYON,
C. H. BANTJE.